(12) United States Patent
Adams et al.

(10) Patent No.: US 11,481,348 B2
(45) Date of Patent: *Oct. 25, 2022

(54) HANDLING OPERATION COLLISIONS IN A NON-VOLATILE MEMORY

(71) Applicant: Micron Technology, Inc., Boise, ID (US)

(72) Inventors: Lyle E. Adams, San Jose, CA (US); Mark Ish, San Ramon, CA (US); Pushpa Seetamraju, San Jose, CA (US); Karl D. Schuh, Santa Cruz, CA (US); Dan Tupy, Roseville, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/161,303

(22) Filed: Jan. 28, 2021

(65) Prior Publication Data

US 2021/0182227 A1 Jun. 17, 2021

Related U.S. Application Data

(63) Continuation of application No. 16/886,656, filed on May 28, 2020, now Pat. No. 10,942,879, which is a (Continued)

(51) Int. Cl.
*G06F 12/14* (2006.01)
*G06F 13/376* (2006.01)
(Continued)

(52) U.S. Cl.
CPC ............ *G06F 13/376* (2013.01); *G06F 3/061* (2013.01); *G06F 3/067* (2013.01); *G06F 3/0659* (2013.01);
(Continued)

(58) Field of Classification Search
CPC ...... G06F 13/376; G06F 3/061; G06F 3/0659; G06F 3/067; G06F 13/1631; G06F 13/1673
See application file for complete search history.

(56) References Cited

U.S. PATENT DOCUMENTS 5,826,070 A * 10/1998 Olson ................. G06F 9/30094
712/E9.05
6,199,107 B1 * 3/2001 Dujari ................. G06F 16/9574
709/219
(Continued)

FOREIGN PATENT DOCUMENTS

| CN | 108874701 A | 11/2018 |
|---|---|---|
| CN | 108958907 A | 12/2018 |
| KR | 10-2016-0023871 A | 3/2016 |

OTHER PUBLICATIONS

International Search Report and Written Opinion, PCT App. No. PCT/US2019/061013, dated Apr. 7, 2020, 10 pages.
(Continued)

*Primary Examiner* — Cheng Yuan Tseng
(74) *Attorney, Agent, or Firm* — Nicholson De Vos Webster & Elliott LLP

(57) ABSTRACT

A first operation identifier is assigned to a current operation directed to a memory component, the first operation identifier having a first entry in a first data structure that associates the first operation identifier with a first buffer identifier. It is determined whether the current operation collides with a prior operation assigned a second operation identifier, the second operation identifier having a second entry in the first data structure that associates the second operation identifier with a second buffer identifier. A latest flag is updated to indicate that the first entry is a latest operation directed to an address (1) in response to determining that the current operation collides with the prior (Continued)

operation and that the current and prior operations are read operations, or (2) in response to determining to determining that the current operation does not collide with a prior operation.

20 Claims, 8 Drawing Sheets

Related U.S. Application Data continuation of application No. 16/693,801, filed on Nov. 25, 2019, now Pat. No. 10,705,996, which is a continuation of application No. 16/223,057, filed on Dec. 17, 2018, now Pat. No. 10,521,383.

(51) Int. Cl.
*G06F 13/16* (2006.01)
*G06F 3/06* (2006.01)

(52) U.S. Cl.
CPC ...... *G06F 13/1631* (2013.01); *G06F 13/1673* (2013.01)

(56) References Cited

U.S. PATENT DOCUMENTS

| | | | | |
|---|---|---|---|---|
| 6,216,200 B1* | 4/2001 | Yeager | ................... | G06F 9/3824 711/3 |
| 6,405,292 B1* | 6/2002 | Joseph | ................ | G06F 12/0806 711/149 |
| 6,850,999 B1* | 2/2005 | Mak | ..................... | H04L 49/901 370/413 |
| 7,340,577 B1* | 3/2008 | Van Dyke | ........... | G06F 13/4243 711/167 |
| 7,617,363 B2* | 11/2009 | Chitlur | .................... | H04L 49/90 709/212 |
| 7,882,339 B2* | 2/2011 | Jacobson | ................ | G06F 9/526 712/244 |
| 9,075,710 B2* | 7/2015 | Talagala | .............. | G06F 12/0246 |
| 9,940,128 B2* | 4/2018 | Steinmacher-Burow | | ................... G06F 12/00 |
| 10,114,748 B2* | 10/2018 | Deshpande | ......... | G06F 12/0828 |
| 10,146,440 B2* | 12/2018 | Li | ......................... | G06F 3/0656 |
| 10,282,308 B2* | 5/2019 | Jayasena | ............. | G06F 12/1027 |
| 10,521,383 B1* | 12/2019 | Adams | .................. | G06F 3/0659 |
| 10,705,996 B1* | 7/2020 | Adams | ................. | G06F 13/1673 |
| 10,942,879 B2* | 3/2021 | Adams | ................ | G06F 13/1631 |
| 2005/0283591 A1 | 12/2005 | Brashears et al. | | |
| 2007/0234310 A1 | 10/2007 | Zhang et al. | | |
| 2012/0317365 A1 | 12/2012 | Elhamias | | |
| 2014/0025902 A1 | 1/2014 | Dhogale | | |
| 2017/0075827 A1 | 3/2017 | Ward et al. | | |

OTHER PUBLICATIONS

Non-Final Office Action, U.S. Appl. No. 16/693,801, dated Dec. 19, 2019, 5 pages.
Non-Final Office Action, U.S. Appl. No. 16/886,656, dated Jul. 14, 2020, 7 pages.
Notice of Allowability, U.S. Appl. No. 16/886,656, dated Oct. 29, 2020, 5 pages.
Notice of Allowance, U.S. Appl. No. 16/693,801, dated Mar. 25, 2020, 7 pages.
First Office Action and Search Report, CN App No. 201980082930. 7, dated Nov. 23, 2021, 10 pages (5 pages of English Translation and 5 pages of Original Document).
International Preliminary Report on Patentability, PCT App. No. PCT/US2019/061013, dated Jul. 1, 2021, 6 pages.

* cited by examiner

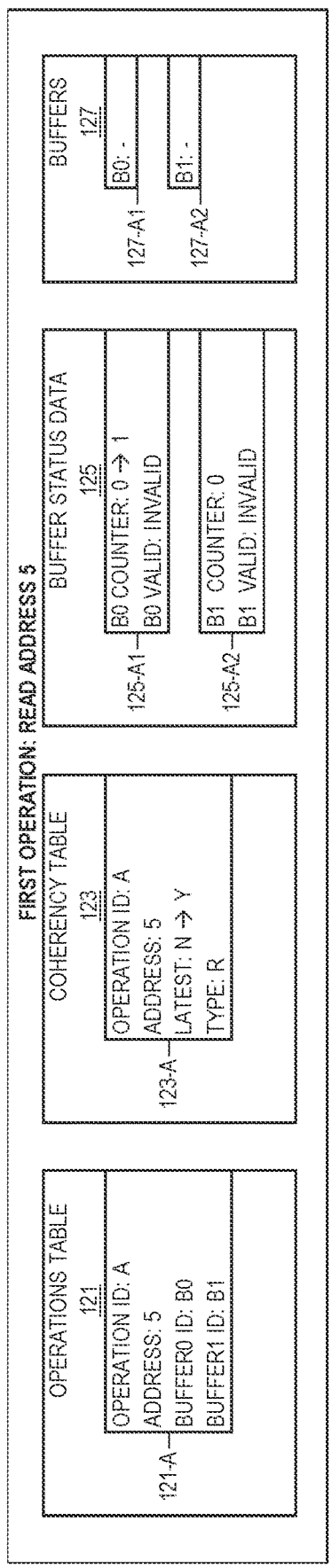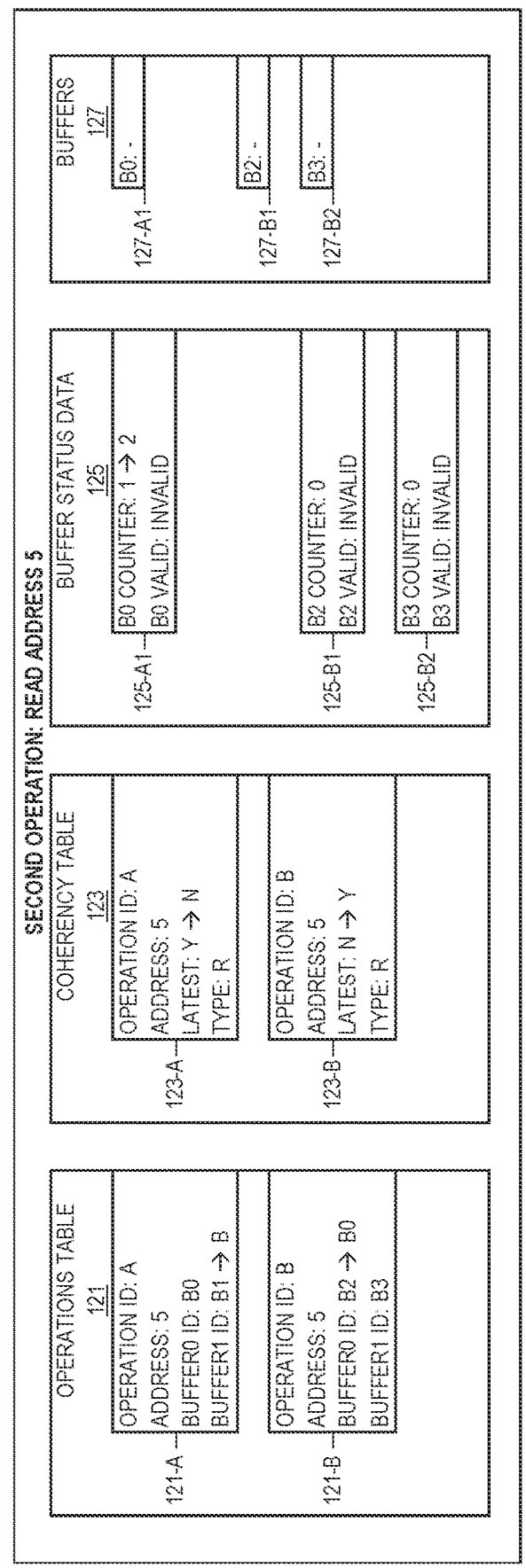
FIG. 4A
FIG. 4B

FOURTH OPERATION: READ ADDRESS 5

OPERATIONS TABLE 121

- 121-A — OPERATION ID: A / ADDRESS: 5 / BUFFER0 ID: B0 / BUFFER1 ID: B
- 121-B — OPERATION ID: B / ADDRESS: 5 / BUFFER0 ID: B0 / BUFFER1 ID: B3
- 121-C — OPERATION ID: C / ADDRESS: 5 / BUFFER0 ID: B4 / BUFFER1 ID: B5
- 121-D — OPERATION ID: D / ADDRESS: 5 / BUFFER0 ID: B6 → B5 / BUFFER1 ID: B7

COHERENCY TABLE 123

- 123-A — OPERATION ID: A / ADDRESS: 5 / LATEST: N / TYPE: R
- 123-B — OPERATION ID: B / ADDRESS: 5 / LATEST: N / TYPE: R
- 123-C — OPERATION ID: C / ADDRESS: 5 / LATEST: Y / TYPE: W
- 123-D — OPERATION ID: D / ADDRESS: 5 / LATEST: N / TYPE: R

BUFFER STATUS DATA 125

- 125-A1 — B0 COUNTER: 2 / B0 VALID: INVALID
- 125-C1 — B4 COUNTER: 1 / B4 VALID: VALID
- 125-C2 — B5 COUNTER: 0 → 1 / B5 VALID: VALID
- 125-D1 — B6 COUNTER: 0 / B7 VALID: INVALID
- 125-D2 — B7 COUNTER: 0 / B7 VALID: INVALID

BUFFERS 127

FIFTH OPERATION: WRITE "99" TO ADDRESS 5

| OPERATIONS TABLE 121 | COHERENCY TABLE 123 | BUFFER STATUS DATA 125 | BUFFERS 127 |
|---|---|---|---|
| 121-A — OPERATION ID: A / ADDRESS: 5 / BUFFER0 ID: B0 / BUFFER1 ID: B | 123-A — OPERATION ID: A / ADDRESS: 5 / LATEST: N / TYPE: R | 125-A1 — B0 COUNTER: 2 / B0 VALID: INVALID | 127-A1 — B0: - |
| 121-B — OPERATION ID: B / ADDRESS: 5 / BUFFER0 ID: B0 / BUFFER1 ID: B3 | 123-B — OPERATION ID: B / ADDRESS: 5 / LATEST: N / TYPE: R | 125-C1 — B4 COUNTER: 1 / B4 VALID: VALID → INVALID | 127-C1 — B4: 50 |
| 121-C — OPERATION ID: C / ADDRESS: 5 / BUFFER0 ID: B4 / BUFFER1 ID: B5 | 123-C — OPERATION ID: C / ADDRESS: 5 / LATEST: Y → N / TYPE: W | 125-C2 — B5 COUNTER: 1 / B5 VALID: VALID | 127-C2 — B5: 50 |
| 121-D — OPERATION ID: D / ADDRESS: 5 / BUFFER0 ID: B5 / BUFFER1 ID: B7 | 123-D — OPERATION ID: D / ADDRESS: 5 / LATEST: N / TYPE: R | 125-E1 — B8 COUNTER: 0 → 1 / B8 VALID: VALID | 127-E1 — B8: 99 |
| 121-E — OPERATION ID: E / ADDRESS: 5 / BUFFER0 ID: B8 / BUFFER1 ID: B9 | 123-E — OPERATION ID: E / ADDRESS: 5 / LATEST: N → Y / TYPE: W | 125-E2 — B9 COUNTER: 0 / B9 VALID: VALID | 127-E2 — B9: 99 |

FIG. 4E

… (cross-reference, technical field, background, drawings description — standard patent front matter)

HANDLING OPERATION COLLISIONS IN A NON-VOLATILE MEMORY

CROSS-REFERENCE TO RELATED APPLICATIONS

This application is a continuation of Ser. No. 16/886,656 filed May 28, 2020, which is a continuation of Ser. No. 16/693,801, filed Nov. 25, 2019, now U.S. Pat. No. 10,705,996, which is a continuation of U.S. patent application Ser. No. 16/223,057, filed Dec. 17, 2018, now U.S. Pat. No. 10,521,383, which is hereby incorporated by reference.

TECHNICAL FIELD

The present disclosure generally relates to non-volatile memory, and more specifically, relates to handling operation conditions in a non-volatile memory.

BACKGROUND ART

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 4A-4E illustrates an exemplary series of colliding operations with reference to the exemplary set of data structures of FIG. 2 in accordance with some embodiments of the present disclosure.

DETAILED DESCRIPTION

Figure 1:
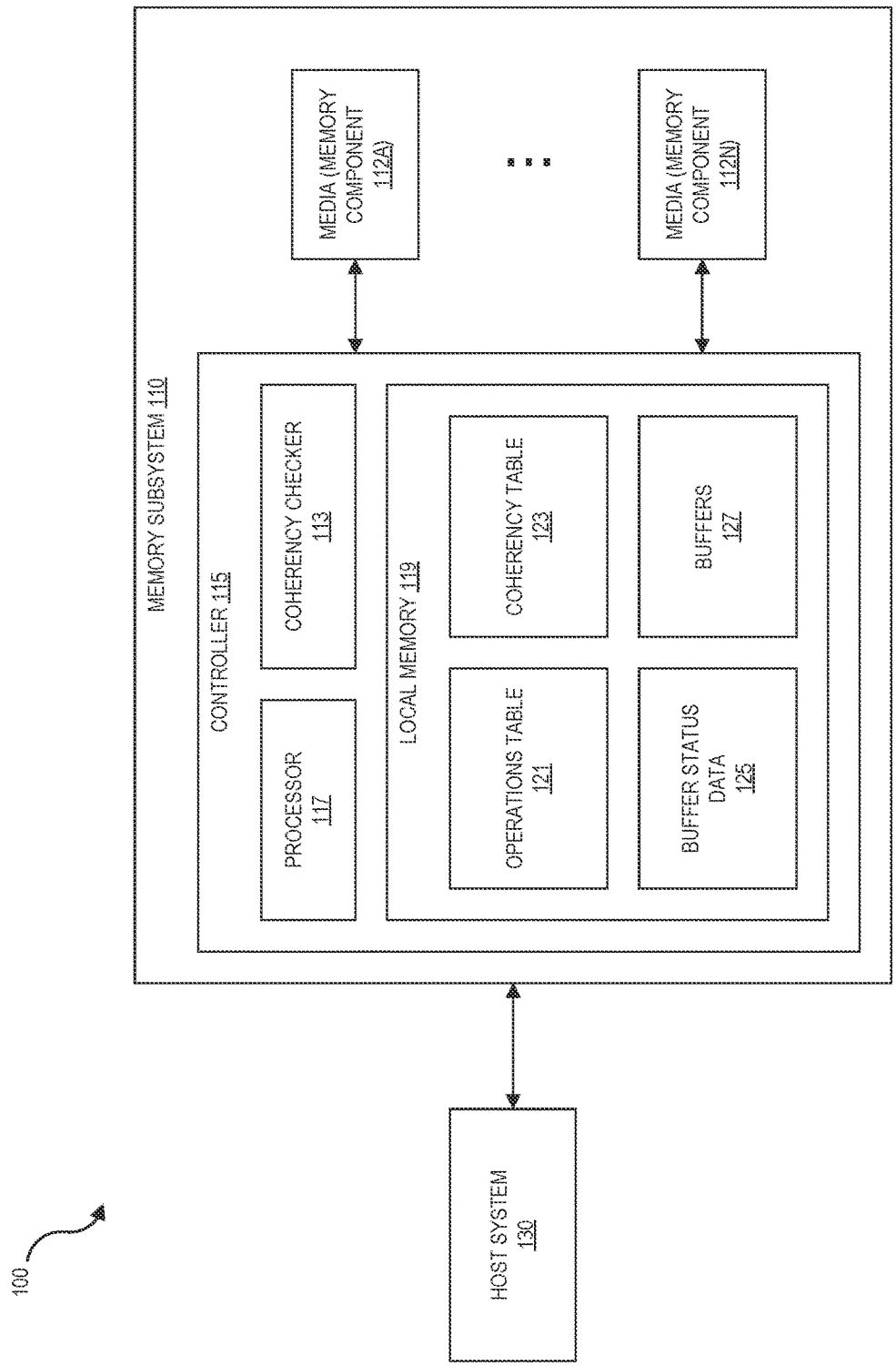
FIG. 1 illustrates an example computing environment that includes a memory subsystem that manages operation collisions in accordance with some embodiments of the present disclosure.

Aspects of the present disclosure are directed to handling operation collisions in a memory subsystem. A memory subsystem is also hereinafter referred to as a "memory device." An example of a memory subsystem is a memory module that is connected to a central processing unit (CPU) via a memory bus. Examples of memory modules include a dual in-line memory module (DIMM), a small outline DIMM (SO-DIMM), a non-volatile dual in-line memory DIMM (NVDIMM), etc. Another example of a memory subsystem is a storage device that is connected to the central processing unit (CPU) via a peripheral interconnect (e.g., an input/output bus, a storage area network, etc.). Examples of storage devices include a solid-state drive (SSD), a flash drive, a universal serial bus (USB) flash drive, and a hard disk drive (HDD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Memory subsystems read or write data in blocks to media. Addresses specify locations within the media where such blocks, sometimes referred to as sectors or pages, are located. Host systems and media management processes internal to a memory subsystem may issue commands to read data from media or write data to media. Regardless of the origin of a command, memory subsystems include a delay between receiving a command and performing the associated read or write operation with the media. Additionally, the memory subsystem may introduce additional delays on individual commands so to collect groups of commands to be carried out with the media together. For example, a memory subsystem may buffer write commands such that the memory subsystem builds up some number of write operations before the associated data is written as a group to media, or the memory subsystem may re-order commands to improve the overall performance of the memory subsystem. These delays result in a disconnect between how the issuer of the command views the data stored on the media and the actual state of the data stored on the media. For example, a host system may write a value to an address of a memory subsystem, which in turn buffers the value for some period of time prior to writing the value to the media. If the host system attempts to read that value from the memory subsystem before the value has been committed to the media, the memory subsystem would return an erroneous value if it returned the value stored in the media rather than the value in the buffer. Commands are sometimes referred to as "in-flight" during the period between receiving a command and the actual execution of that command on media. Collisions occur when in-flight operations target the same address. For example, a read command may follow a write command before the data associated with the write is written to media. If the memory subsystem fulfills the read command from the media (e.g., while buffering the write data to group with other write commands), the memory subsystem can return erroneous data to the issuer of the command. To avoid returning erroneous data, some memory subsystems block colliding operations resulting in a reduction in performance because the blocked operations must wait for the blocking operations to complete before they can be processed.

Aspects of the present disclosure address the above and other deficiencies by detecting operation collisions and allowing colliding operations to proceed without blocking. Embodiments include a memory subsystem that checks for collisions of in-flight operations. In particular, a coherency checker component checks for and handles collisions. The coherency checker component maintains a data structure that identifies the latest in-flight operation to any address. Upon receipt of a new operation, the coherency checker checks whether the address of the new operation matches any of the addresses associated with the latest pending operations. In the case of a collision, the memory subsystem updates flags and buffer identifiers associated with the new and matching operations. As a result, embodiments of the present disclosure can ensure that one or more of the following occur: (1) write operations that collide with previous write operations supersede the prior write operations to avoid unnecessary writes to media, (2) read operations that collide with previous write operations are satisfied using the in-flight write data, and (3) read operations that collide with previous read operations are chained such that a single media access satisfies each of the colliding read operations. In doing so, embodiments of the present disclosure provide one or more of the following: improved data integrity, efficient use of buffer memory resources, a reduction in the number of operations that require a media access, increased performance by avoiding blocking colliding operations, and avoiding disturbing data stored on the media.

FIG. 1 illustrates an example computing environment 100 that includes a memory subsystem 110 that manages operation collisions in accordance with some embodiments of the present disclosure. The memory subsystem 110 can include media, such as memory components 112A to 112N. The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 130 that uses the memory subsystem 110. For example, the host system 130 can write data to the memory subsystem 110 and read data from the memory subsystem 110.

The host system 130 can be a computing device such as a desktop computer, laptop computer, network server, mobile device, or such computing device that includes a memory and a processing device. The host system 130 can include or be coupled to the memory subsystem 110 so that the host system 130 can read data from or write data to the memory subsystem 110. The host system 130 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 130 and the memory subsystem 110. The host system 130 can further utilize an NVM Express (NVMe) interface to access the memory components 112A to 112N when the memory subsystem 110 is coupled with the host system 130 by the PCIe interface. The physical host interface can provide an interface for passing control, address, data, and other signals between the memory subsystem 110 and the host system 130.

The memory components 112A to 112N can include any combination of the different types of non-volatile memory components and/or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 130. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 130. In some embodiments, the local memory 119 can include memory registers storing memory pointers, fetched data, etc. The local memory 119 can also include read-only memory (ROM) for storing micro-code. Although illustrated as part of controller 115, the local memory 119 may comprise one or more internal memories within the controller 115 and/or one or more external memories coupled to the controller 115. While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 130 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 130 via the physical host interface. The host interface circuitry can convert the commands received from the host system into command instructions to access the memory components 112A to 112N as well as convert responses associated with the memory components 112A to 112N into information for the host system 130.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

The memory subsystem 110 includes a coherency checker component 113 ("coherency checker 113") that can detect in-flight operation collisions so that the coherency checker component 113 and the processor 117, can manage such collisions. The coherency checker component 113, in conjunction with the processor 117, maintain and refer to several data structures and buffers stored in the local memory 119, including an operations table 121, a coherency table 123, buffer status data 125, and a plurality of buffers 127, each of which is described in further detail below with reference to FIG. 2. Although certain operations are described as performed by either the coherency checker component 113 or the processor 117, in certain embodiments described herein, such operations may be implemented as part of the controller 115 as hardware, software, or as a combination of hardware and software. For example, the operations of the coherency checker 113 as described herein may be implemented as software instructions executed by the processor 117 or another processing device of the controller 115, and the operations of the processor 117 may be implemented by dedicated hardware or circuitry of the controller 115. Further details with regards to the operations of the coherency checker 113 are described below.

Figure 2:
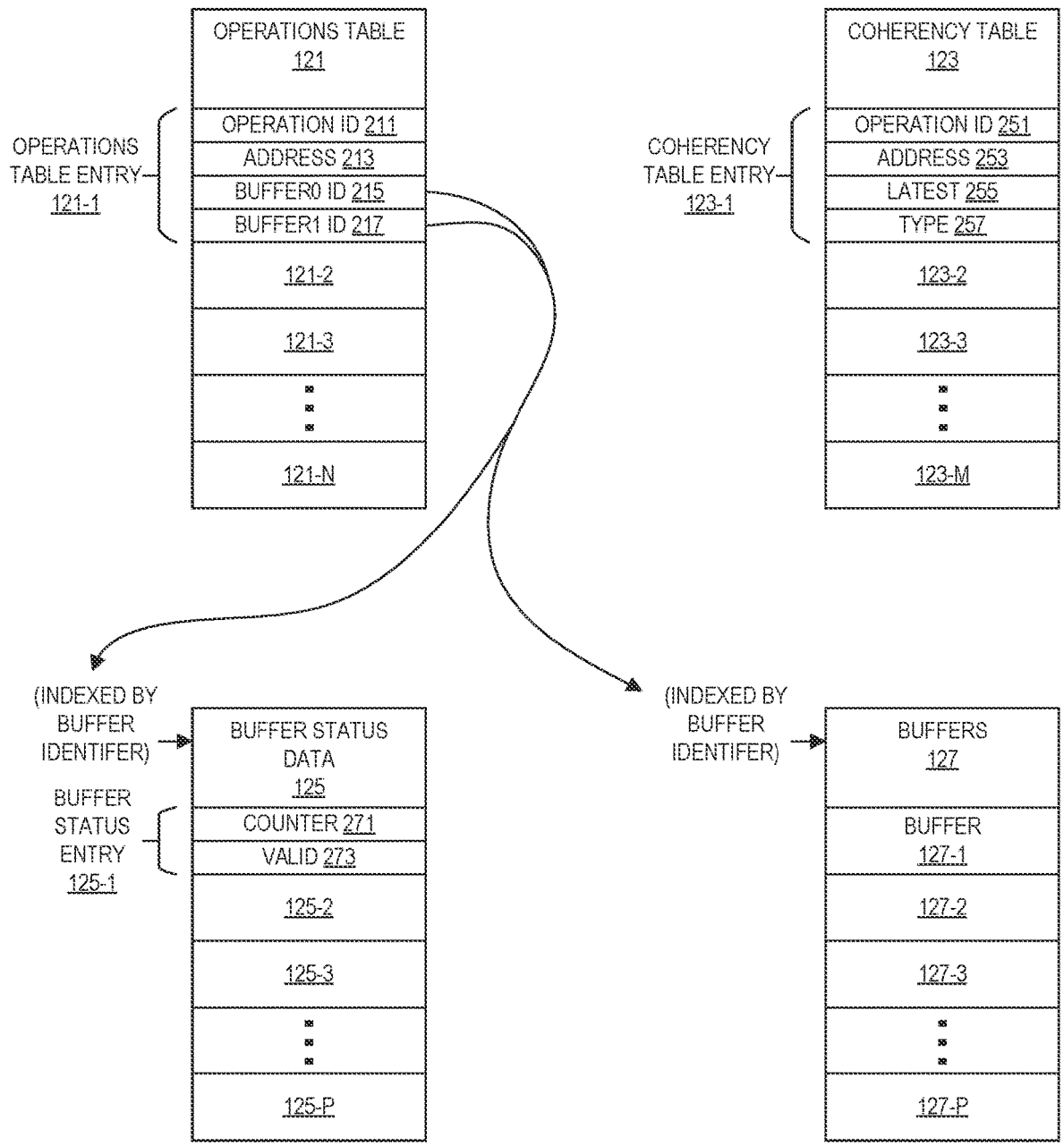
FIG. 2 illustrates an exemplary set of data structures used in the management of operation collisions in a memory subsystem in accordance with some embodiments of the present disclosure.

FIG. 2 illustrates an exemplary set of data structures used in the management of operation collisions in a memory subsystem in accordance with some embodiments of the present disclosure. The data structures include an operations table 121, a coherency table 123, buffer status data 125, and buffers 127. In some embodiments, the data structures are stored in the local memory 119.

Buffers 127 represent regions in memory allocated for individual buffers (e.g., buffers 127-1 through 127-P). Buffers 127 store data associated with read or write operations. For write operations, the processor 117 allocates one or more buffers 127 to store the data associated with the write operation before it is written to media. In some embodiments, the processor allocates two buffers per write operation: one buffer to store unencoded data and another buffer to store encoded data (e.g., data with error correcting codes that is written to media). For read operations, the processor 117 allocates one or more buffers 127 to store the data read from the media prior to sending such data to the issuer of the read operation. In some embodiments, the processor 117 allocates buffers in response to receiving a read or a write command, while in other embodiments the processor 117 defers buffer allocation until the data to be buffered is available.

The operations table 121 stores data related to all in-flight operations. Each in-flight operation has an entry within the operations table 121. Each entry in the operations table 121 has several fields, including an operation identifier 211, an address 213, a first buffer identifier 215 (sometimes referred to as "buffer0" for the entry), and a second buffer identifier 217 (sometimes referred to as "buffer1" for the entry). The operation identifier 211 uniquely identifies a given in-flight operation from other in-flight operations. In some embodiments, the processor 117 assigns the operation identifier 211 to each operation whether received from the host system 130 or from an internal media management process. In some embodiments, the operation identifier 211 implicitly distinguishes between read and write operations (e.g., identifiers that end in a '0' correspond to reads, while identifiers that end in a '1' correspond to writes). In other embodiments, an entry 121 includes another field (not shown) that identifies the operation type as a read or a write. The address 213 corresponds a location in media associated with the operation, such as a logical address or a physical address. The first buffer identifier 215 and the second buffer identifier 217 can be used to identify buffers 127 and buffer status entries 125. In identifying buffers 127 or buffer status entries 125, the buffer identifiers 215 and 217 can correspond to memory locations in the buffers 127 or to entries in the buffer status data 125. For example, the buffer identifiers 215, 217 can index the memory address range allocated for the buffer status data 125 and the buffers 127 as an offset to starting addresses associated with the buffer status data 125 and with the buffers 127.

The coherency table 123 stores data for managing collisions of in-flight operations. Each in-flight operation has an entry within the coherency table 123. Each entry in the coherency table 123 has several fields, including an operation identifier 251, an address 253, a latest flag 255, and a type flag 257. The operation identifier 251 corresponds to the operation identifier 211 that is used to uniquely identify in-flight operations. The address 253 corresponds to the media address associated with the operation. The latest flag 255 indicates whether the particular entry within the coherency table 123 is the latest of potentially multiple operations targeting the same media address. For example, if the coherency table 123 includes an entry for address 5 and a new operation targets address 5, the entry in the coherency table 123 associated with the new operation would have the latest flag set while the earlier entry would not. The type flag 257 can be included to indicate whether the operation associated with the entry is a read or a write operation. Again, in some embodiments, such an indication can be implicit within the operation identifier 251 and thus not stored as a separate field within an entry. In some embodiments, the coherency table 123 and the operations table 121 are combined such that an entry in the combined table includes an operation identifier 211, an address 213, a first buffer identifier 215, a second buffer identifier 217, a latest flag 255, and a type flag 257. By separating the tables, the processor 117 and the coherency checker 113 may have different access permissions to the data (e.g., only the coherency checker can write or modify the coherency table 123).

The buffer status data 125 stores data about each buffer in the buffers 127. Each buffer has an associated entry in the buffer status data 125. Each entry in the buffer status data 125 includes a counter 271 and a valid flag 273. The counter 271 reflects the number of in-flight operations that are pending against the associated buffer. The valid flag 273 indicates whether the data stored in the buffer is valid. For example, the processor 117 may set the valid flag 273 associated with a buffer allocated to a read operation once the data has been read from media. As another example, the processor 117 may clear the valid flag 273 in response to the coherency checker indicating that a write operation has superseded a buffer associated with a previous write operation. In some embodiments, entries in the buffer status data 125 are combined with its associated buffer in a single block of memory (e.g., the buffer status data 125 and buffers 127 are interleaved within the same memory space).

Figure 3:
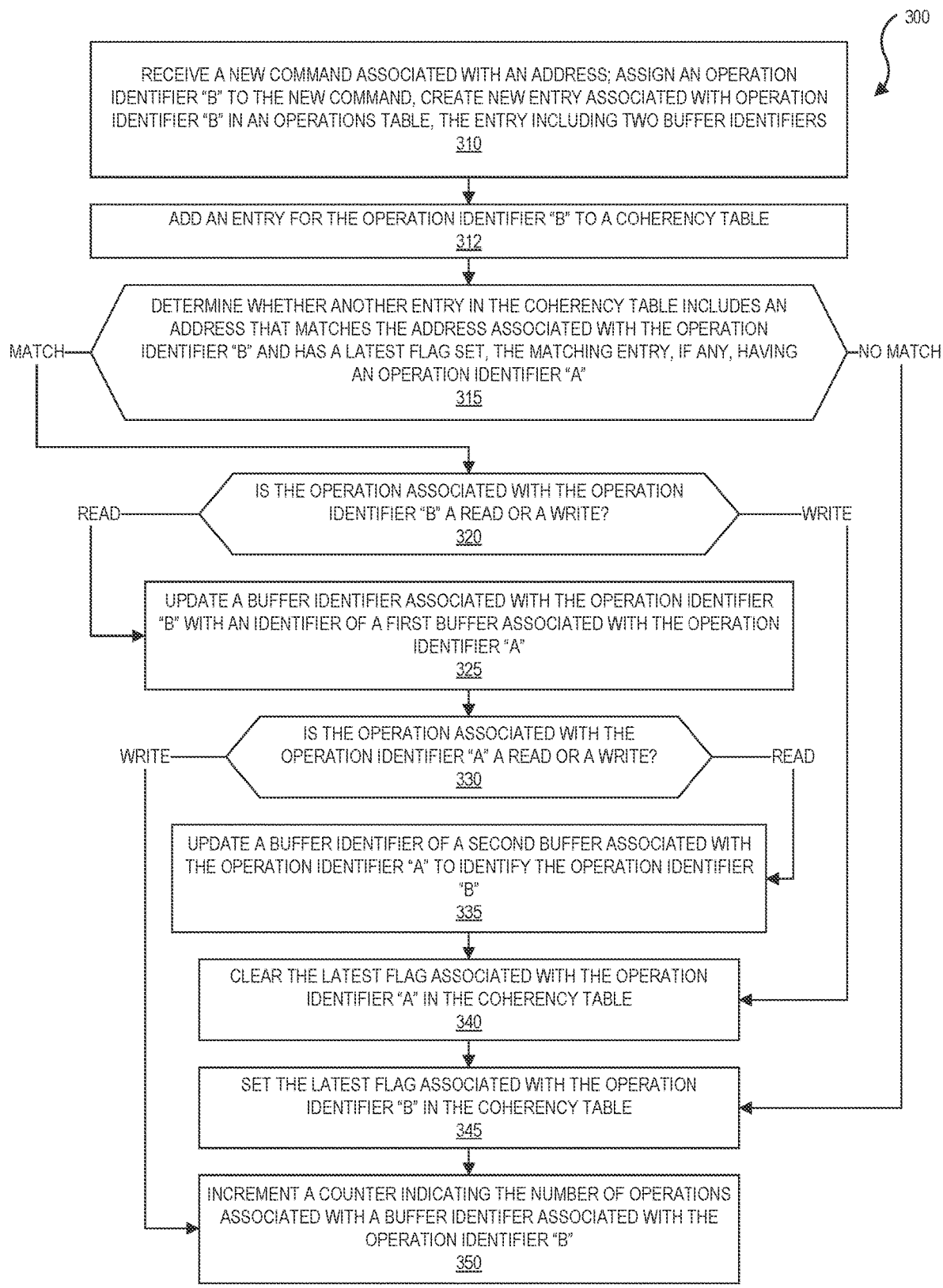
FIG. 3 is a flow diagram of an example method to manage operation collisions in accordance with some embodiments of the present disclosure.

FIG. 3 is a flow diagram of an example method 300 to manage operation collisions in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by components of the controller 115, such as the processor 117 and the coherency checker 113, as indicated below. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 310, the processing device receives a new command associated with an address and assigns an operation identifier to the new command. The operation identifier uniquely identifies the command relative to other in-flight commands. Operation identifiers can be consecutively assigned values from zero to N where N is large enough such that by the time the operation identifiers restart at zero any pending operations previously assigned low-numbered operation identifiers have been completed. In this example, the operation identifier assigned to the new command is referenced as "B." With reference to FIGS. 1 and 2, these operations may be performed by the processor 117 as part of creating a new entry within the operations table 121 that includes the assigned operation identifier and two buffer identifiers. In some embodiments, the processor 117 further allocates two buffers and initially sets the buffer identifiers to identify the two allocated buffers.

At block 312, the processing device adds an entry for the operation identifier B to a coherency table. For example, the processor 117 sends a message to the coherency checker 113, the message including one or more of the fields of the entry within the operations table created at block 310 and associated with the operation identifier B. The coherency checker 113 creates a new entry within the coherency table 123 for the operation identifier B. The new entry for the operation includes the operation identifier B, the associated address, and may include a type field indicating whether the operation associated with operation identifier B is a read or a write operation (e.g., if such an indication is not implicit within operation identifier B). Whether a latest flag associated with the new entry in the coherency table 123 is set is described below.

At block 315, the processing device determines whether another entry in the coherency table includes an address that matches the address associated with the operation identifier B and has the latest flag set. Here, the coherency checker 113 detects collisions between in-flight operations. For example, the coherency checker 113 compares the address of the operation identifier B to each of the addresses 253 within the other entries in the coherency table 123 that have a latest flag 255 set. In some embodiments, the coherency checker 113 sequentially compares each candidate entry in the coherency table 123 to identify a collision. In some embodiments, the coherency checker 113 can look-up a colliding entry in the coherency table directly (e.g., using a content-addressable memory indexed by address that stores a value identifying the entry (if any) associated with the latest operation). Note that the addresses used in the comparison may be logical or physical addresses, depending on any address translations that occur between the address space of the host system 130 and the physical addresses of the media (e.g., memory components 112A to 112N). As described below, the latest flags associated with entries in the coherency table 123 allow the coherency checker to maintain the identity of the latest in-flight operation. In this example, the operation identifier associated with a matching entry, if any, is referred to as operation identifier A. If there is no match, operations of the method 300 proceed to block 345, otherwise, operations continue to block 320.

At block 320, the processing device checks whether the operation type associated with the operation identifier B is a read or a write. For example, the coherency checker 113 checks the operation identifier B (e.g., if the operation type is implicit in the operation identifier) or another field (e.g., stored in the coherency table entry for operation identifier B) that indicates the operation type. If the operation associated with operation identifier B is a write command, operations of the method 300 proceed to block 340, otherwise, operations continue to block 325.

At block 325, the processing device updates a buffer identifier associated with the operation identifier B with an identifier of a first buffer associated with the operation identifier A. At this stage, the processing device has determined that there is a collision between the operation associated with operation identifier B—a read operation—and a prior operation associated with operation identifier A. As a result, the coherency checker 113 updates a buffer identifier associated with operation identifier B to point to a buffer identified by a buffer identifier associated with the operation identified by operation identifier A. For example, if the operation associated with operation identifier A is a write operation, the coherency checker 113 redirects the subsequent read operation to the buffer associated with the write operation that contains the unencoded write data. As another example, if the operation associated with operation identifier A was a read operation, the coherency checker redirects the subsequent read operation to the buffer containing the data read from media (or the buffer where the data will be stored once it is read from media). To perform the update, the coherency checker 113 may update the entry associated with operation identifier B in the operations table 121 directly or cause the processor 117 to perform the update.

At block 330, the processing device checks whether the operation type associated with the operation identifier A is a read or a write. Again, the coherency checker 113 may check the operation identifier A (e.g., if the type is implicit in the operation identifier) or another field (e.g., stored in the coherency table entry for operation identifier A) that indicates the operation type. If the operation associated with operation identifier A is a write command, operations of the method 300 proceed to block 350, otherwise, operations continue to block 335.

At block 335, the processing device updates a buffer identifier of a second buffer associated with the operation identifier A to identify the operation identifier B (rather than a buffer). At this stage, the processing device has determined that there is a collision of sequential read operations. By updating a buffer identifier associated with the original read operation to identify the operation identifier of the subsequent read operation, the processing device can identify the subsequent read operation(s) that can be fulfilled after the original read operation is fulfilled (e.g., with data read from the media). In other words, once the processing device has read the data from the media into a first buffer identified by a buffer identifier associated with operation identifier A, the processing device can identify the next pending read operation (e.g., operation identifier B) based on the operation identifier stored in the buffer identifier associated with operation identifier A. As a result, the operation associated with operation identifier B can be fulfilled without performing another media read operation. To perform the update at block 335, the coherency checker 113 may update the entry associated with operation identifier A in the operations table 121 directly or cause the processor 117 to perform the update.

At block 340, the processing device clears the latest flag associated with the operation identifier A in the coherency table. At this stage, the processing device has determined that the operation associated with operation identifier B (whether a read or a write) collided with a prior read operation identified by operation identifier A. The coherency checker 113 clears the latest flag associated with operation identifier A in the coherency table.

At block 345, the processing device sets the latest flag associated with the operation identifier B in the coherency table. At this stage, the processing device has determined that there was no collision or that the operation associated with operation identifier B (whether a read or a write) collided with a prior read operation identified by operation identifier A. The coherency checker 113 sets the latest flag associated with the operation identifier B in the coherency table.

At block 350, the processing device increments a counter indicating the number of operations associated with a buffer identifier associated with the operation identifier B. In particular, a counter 271 in the buffer status data 125 tracks whether an associated buffer has pending operations against it. A non-zero value indicates there are pending operations. If there is no collision, the counter associated with the newly allocated buffer for the command is incremented from '0' to '1' (where it is initialized to '0'). If there is a collision with a previous read or write operation, the processing device updates the buffer identifier associated with the latest operation to point to the buffer identified by the previous operation and increments the counter associated with that buffer. For example, a read operation may collide with an in-flight write operation. As a result, the buffer for the pending write operation may also have the pending read operation outstanding against it, so the associated counter would be incremented from '1' to '2' reflect the two pending operations associated with the buffer. As subsequent commands are redirected to buffers associated with previous in-flight commands, the associated counters may be incremented accordingly (e.g., from '1' to '2,' from '2' to '3', etc.).

Note that the method 300 results in the coherency table entry associated with the most recent operation having the latest flag set for colliding writes, colliding reads, and writes following reads. When a read operation follows a write operation, method 300 proceeds from block 330 to block 350 and the latest flag associated with the write operation remains set. As a result, in the case of a read operation colliding with an earlier write operation, the read operation and any subsequent read operations without an intervening write operation are fulfilled from the buffer associated with the write operation.

In some embodiments, the processes associated with blocks 315 through 350 are atomic in that no other operations can modify the coherency table during the processing associated with blocks 315 through 320.

While not illustrated in FIG. 3, the coherency checker 113 returns information related to a collision (if any) to the processor 117 in some embodiments. Such information can include the operation identifier in the coherency table entry that resulted in the collision. The processor 117 can track these collisions to determine when to release allocated buffers, flush any associated buffer status data, and instruct the coherency checker 113 to remove entries from the coherency table 123 as media operations complete.

FIGS. 4A-4E illustrate an exemplary series of colliding operations with reference to the exemplary set of data structures of FIG. 2 in accordance with some embodiments of the present disclosure. In particular, FIGS. 4A-4E illustrate a read-read-write-read-write operation collision sequence to address "5" before the first read operation is satisfied from the media (e.g., memory components 112A to 112N). The operations may be initiated by the host system 130 or by media management processes carried out by the controller 115. Changes to data in the various data structures are indicated by an arrow ("→").

FIG. 4A illustrates the state of the data structures after a read operation to read the data at address 5 is initiated but before the data is obtained from the media (e.g., memory components 112A-112N). Upon receipt of the read operation (e.g., from the host system 130 or from a media management process internal to the memory subsystem 110), the processor 117 assigns operation identifier A to the read operation and adds an operations table entry 121-A to the operations table 121. Operations table entry 121-A includes an identification of the associated address (5), and buffer identifiers "B0" and "B1" that identify buffers 127-A1 and 127-A2 in the buffers 127. Buffer identifiers B0 and B1 also identify buffer status entries 125-A1 and 125-A2 in the buffer status data 125. Since the data has not been read from media, the buffer status entries 125-A1 and 125-A2 indicate whatever data (if any) stored in the buffers 127-A1 and 127-A2 is invalid.

The processor 117 initiates a collision check with the coherency checker 113 based on the operation identifier A. The processor 117 can further send the address and the type of the operation to the coherency checker 113, or the coherency checker 113 can obtain the address from the operations table 121. Note that for illustrative purposes, the coherency table 123 includes an operation type (e.g., read or write) while the operations table 121 does not include an operation type. As indicated above, operation types may be implicit in the assigned operation identifiers or stored as a separate value in one or both of the operations table 121 or the coherency table 123, depending on the implementation. Since this is the first operation in this exemplary collision sequence, the coherency checker 113 checks whether the coherency table 123 includes an entry with the same address and having the latest flag set and does not identify a collision. The coherency checker adds coherency table entry 123-A to the coherency table 123. The coherency table entry 123-A indicates that operation identifier A is a read operation of address 5. The coherency checker 113 sets the latest flag associated with entry 123-A since this is the only in-flight operation directed to address 5. In this embodiment, buffer0 is used to buffer data read from media before being sent to the host system 130, so the coherency checker 113 updates the counter associated with buffer0 from 0 to 1. After incrementing the counter, the buffer status entry 125-A1 indicates that there is one pending operation (the read) against the buffer 127-A1. With reference to FIG. 3, the state of the data structures in FIG. 4A reflects the block sequence 310, 312, 315, 345, and 350.

FIG. 4B illustrates the state of the data structures after the receipt of another read operation of the data at address 5 following the previous read operation described with reference to FIG. 4A. Upon receipt of the read operation, the processor 117 assigns operation identifier B to the read operation and adds operations table entry 121-B to the operations table 121. Operations table entry 121-B includes an identification of the associated address (5), and buffer identifiers "B2" and "B3" that initially identify buffers 127-B1 and 127-B2 in the buffers 127. Buffer identifiers B2 and B3 also identify buffer status entries 125-B1 and 125-B2 in the buffer status data 125 that indicate the data (if any) stored in buffers 127-B1 and 127-B2 is invalid.

The processor 117 initiates a collision check with the coherency checker 113 based on the operation identifier B and may send the address and type of operation, as described above with reference to FIG. 4A. Since the read operation associated with FIG. 4B is the second operation in the collision sequence, when the coherency checker 113 checks whether the coherency table 123 includes an entry with the same address and having the latest flag set, the coherency checker 113 identifies a collision with the coherency table entry 123-A. The coherency checker 113 updates the buffer1 buffer identifier associated with operations table entry 121-A to identify operation identifier B. Since this is a read operation colliding with a prior read operation, the coherency checker 113 further updates the buffer0 buffer identifier associated with operations table entry 121-B to buffer identifier B0 associated with operations table entry 121-A. In this manner, once the media operation to fulfill operation identifier A has been performed, the operations table entry 121-A can be used to identify any subsequent read operations that can also be fulfilled (e.g., with the operation identifier B stored in the buffer1 buffer identifier). Since this is a read operation colliding with a prior read operation, the coherency checker 113 also updates the latest flags in coherency table entries 123-A and 123-B to identify the operation associated with operation identifier B as the latest operation with address 5. The coherency checker 113 also updates the counter in buffer status entry 125-A1 to indicate that the buffer B0 has two pending operations against it: the reads associated with operation identifiers "A" and "B." Note that the buffer 127-A2 in FIG. 4A and associated status data are no longer illustrated in FIG. 4B as that buffer is not referenced in subsequent operations. The buffer 127-A2 may be released sometime before or after processing of the second operation or never allocated, depending on the implementation.

With reference to FIG. 3, the state of the data structures in FIG. 4B reflects the block sequence 310, 312, 315, 320, 325, 330, 335, 340, 345, and 350.

Figure 4C:
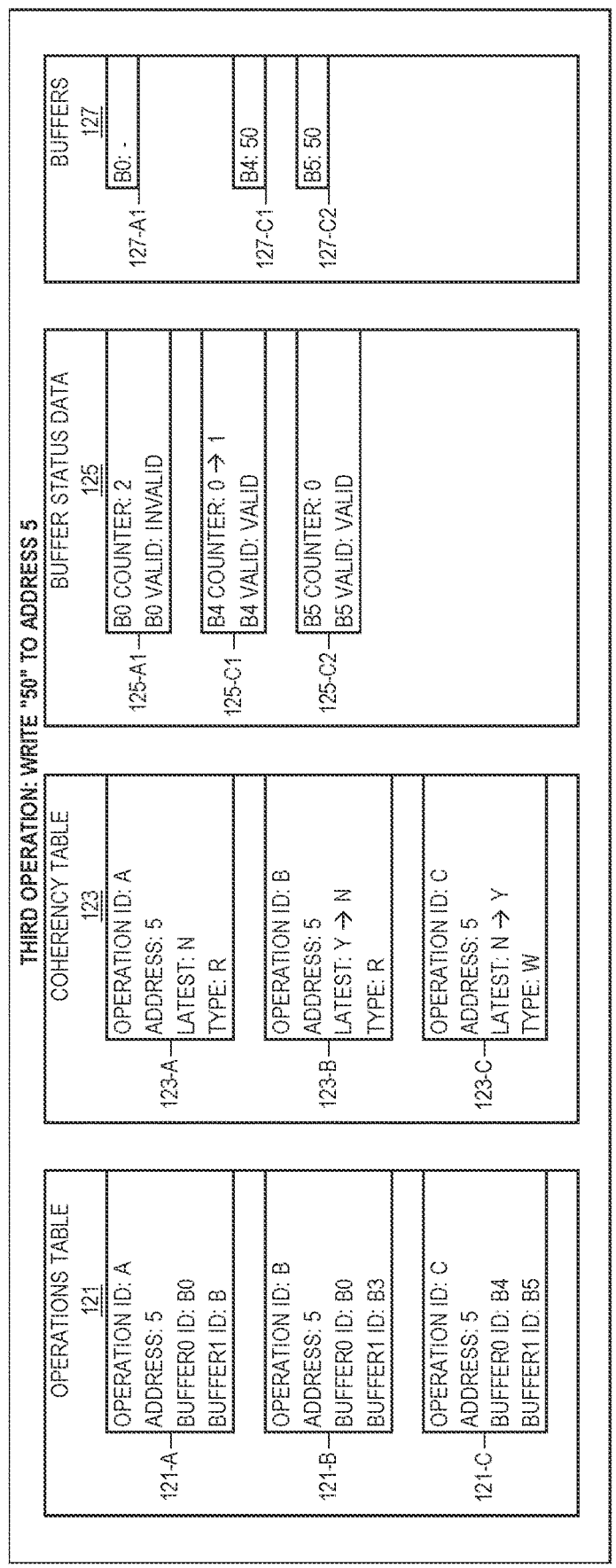

FIG. 4C illustrates the state of the data structures after a write of the value "50" to address 5 following the previous read-read operation sequence described with reference to FIGS. 4A and 4B. Upon receipt of the write operation, the processor 117 assigns operation identifier C to the write operation and adds operations table entry 121-C to the operations table 121. Operations table entry 121-C includes an identification of the associated address (5), and buffer identifiers "B4" and "B5" that identify buffers 127-C1 and 127-C2 in the buffers 127. Buffer identifiers B4 and B5 also identify buffer status entries 125-C1 and 125-C2 in the buffer status data 125 that indicate the data stored in buffers 127-C1 and 127-C2 is valid since the data is associated with a write operation to be committed to media. For write operations, the buffer1 of an entry in the operations table 121 stores the unencoded write data while the buffer0 stores the encoded write data (e.g., after encoding), in the illustrated embodiment. For example, buffer0 may initially store unencoded data before the processor 117 or an encoder (not shown) encodes the data in buffer0 and writes the encoded data back to buffer0. Thus, prior to encoding, buffers 127-C1 and 127-C2 store the value "50."

The processor 117 initiates a collision check with the coherency checker 113 based on the operation identifier C and may send the address and type of operation, as described above with reference to FIG. 4A. The coherency checker 113 checks whether the coherency table 123 includes an entry with the same address as the current operation and having the latest flag set. The coherency checker 113 identifies a collision with the coherency table entry 123-B. As a write operation colliding with a prior read operation, the coherency checker 113 updates the latest flags in coherency table entries 123-B and 123-C to identify the operation associated with operation identifier C as the latest operation with address 5. The coherency checker 113 also updates the counter in buffer status entry 125-C1 to indicate that the buffer B4 (which stores the encoded write data) has one pending operations against it: the write associated with operation identifier C. Note that the buffers 127-B1 and 127-B2 and associated status data in FIG. 4B are no longer illustrated in FIG. 4C as those buffers are not referenced in subsequent operations. The buffers 127-B1 and 127-B2 may be released sometime before or after processing of the third operation or never allocated, depending on the implementation.

With reference to FIG. 3, the state of the data structures in FIG. 4C reflects the block sequence 310, 312, 315, 320, 340, 345, 350. Note that since the prior read operations must still be fulfilled from the media, the buffer identifiers associated with the operations in the prior read-read sequence remain unchanged.

FIG. 4D illustrates the state of the data structures after a read of the data at address 5 following the previous read-read-write operation sequence described with reference to FIGS. 4A-4C. Upon receipt of the read operation, the processor 117 assigns operation identifier D to the read operation and adds operations table entry 121-D to the operations table 121. Operations table entry 121-D includes an identification of the associated address (5), and buffer identifiers "B6" and "B7" that identify buffers 127-D1 and 127-D2 in the buffers 127. Buffer identifiers B6 and B7 also identify buffer status entries 125-D1 and 125-D2 in the buffer status data 125 that indicate the data stored in buffers 127-D1 and 127-D2 is invalid.

The processor 117 initiates a collision check with the coherency checker 113 based on the operation identifier D and may send the address and type of operation, as described above with reference to FIG. 4A. Since the read operation associated with FIG. 4D is another operation in the collision sequence, the coherency checker 113 checks whether the coherency table 123 includes an entry with the same address and having the latest flag set and identifies a collision with the coherency table entry 123-C. The coherency checker 113 updates the buffer0 buffer identifier associated with operations table entry 121-D to identify the buffer B5 identified by the buffer1 buffer identifier associated with operations table entry 121-C (the unencoded data for the write operation). In this manner, the read operation can be satisfied from the latest write operation that has yet to be committed to media. The coherency checker 113 updates the counter in buffer status entry 125-C2 to indicate that the buffer B5 (which stores the unencoded write data) has a pending operation against it: the read associated with operation identifier D. Of note, the coherency checker 113 does not set the latest flag associated with the coherency table entry 123-D so that future operations will continue to collide with the write operation associated with operation identifier C, such as future read operations that collide with and are fulfilled from the data buffer B5.

With reference to FIG. 3, the state of the data structures in FIG. 4D reflects the block sequence 310, 312, 315, 320, 325, 330, 350.

FIG. 4E illustrates the state of the data structures after a write of the value "99" to address 5 following the previous read-read-write-read operation sequence described with reference to FIGS. 4A-4D. Upon receipt of the write operation, the processor 117 assigns operation identifier E to the write operation and adds operations table entry 121-E to the operations table 121. Operations table entry 121-E includes an identification of the associated address (5), and buffer identifiers "B8" and "B9" that identify buffers 127-E1 and 127-E2 in the buffers 127. Buffer identifiers B8 and B9 also identify buffer status entries 125-E1 and 125-E2 in the buffer status data 125 that indicate the data stored in buffers 127-E1 and 127-E2 is valid. Again, buffer1 stores unencoded write data while buffer0 stores write data before and after encoding. Prior to encoding, buffers 127-E1 and 127-E2 store the value "99."

The processor 117 initiates a collision check with the coherency checker 113 based on the operation identifier C and may send the address and type of operation, as described above with reference to FIG. 4A. Since the write operation associated with FIG. 4C is another operation in the collision sequence, the coherency checker 113 checks whether the coherency table 123 includes an entry with the same address and having the latest flag set and identifies a collision with the coherency table entry 123-C. As a write operation colliding with a prior write operation, the coherency checker 113 updates the latest flags in coherency table entries 123-C and 123-E to identify the operation associated with operation identifier E as the latest operation with address 5. The coherency checker 113 also updates the counter in buffer status entry 125-E1 to indicate that the buffer B8 has one pending operations against it: the write associated with operation identifier E. Further, the coherency checker 113 clears the valid flag associated with the buffer status entry 125-C1 to indicate the prior pending write operation need not be carried out to the media. Note that the read operation between the write operations remains queued against buffer B5. Note that the buffers 127-D1 and 127-D2 and associated status data in FIG. 4D are no longer illustrated in FIG. 4E. The buffers 127-D1 and 127-D2 may be released sometime before or after processing of the fifth operation or never allocated, depending on the implementation.

With reference to FIG. 3, the state of the data structures in FIG. 4E reflects the block sequence 310, 312, 315, 320, 340, 345, 350.

Note that the illustrations of buffers 127 and associated buffer status data 125 in FIGS. 4A-4E show buffers that are allocated with a new operation and released prior to a subsequent operation in the case where the allocated buffers are no longer needed. The specific timing of the allocation and release of buffers is implementation specific. For example, a background process executed by the processor 117 can periodically release allocated buffers with zero-valued counters and clear valid data flags in the buffer status data. Thus, the disappearance of buffer 127-A2 and buffer status entry 125-A2 in FIG. 4B, buffers 127-B1 and -B2 and buffer status entries 125-B1 and -B2 in FIG. 4C, and buffers 127-D1 and -D2 and buffer status entries 125-D1 and -D2 in FIG. DE is not intended to be illustrative of a particular buffer release protocol and may vary from embodiment to embodiment.

Note that in some embodiments, a single buffer can be allocated per command. To facilitate identifying several colliding reads in a sequence, entries in the operations table 121 associated with read operations can include a pointer to identify subsequent read collisions (e.g., the first read operation has a buffer and a pointer to the second operation, the second operation using the same buffer). For write operations that involve the encoding of write data, entries in the buffer status data 125 can indicate whether the data within the buffer is encoded. If so, read operations that are directed to the buffer associated with the prior write operation can be fulfilled from the encoded data by decoding the data prior to returning it to the host system. Further note that in some embodiments, the processing device can allocate buffers on-demand rather than whenever a new command is received from the host system. For example, the processing device can allocate a single buffer for a read operation and, upon receiving a colliding read operation, allocate additional memory to the original read operation to include a pointer to the subsequent, colliding read operation.

Figure 5:
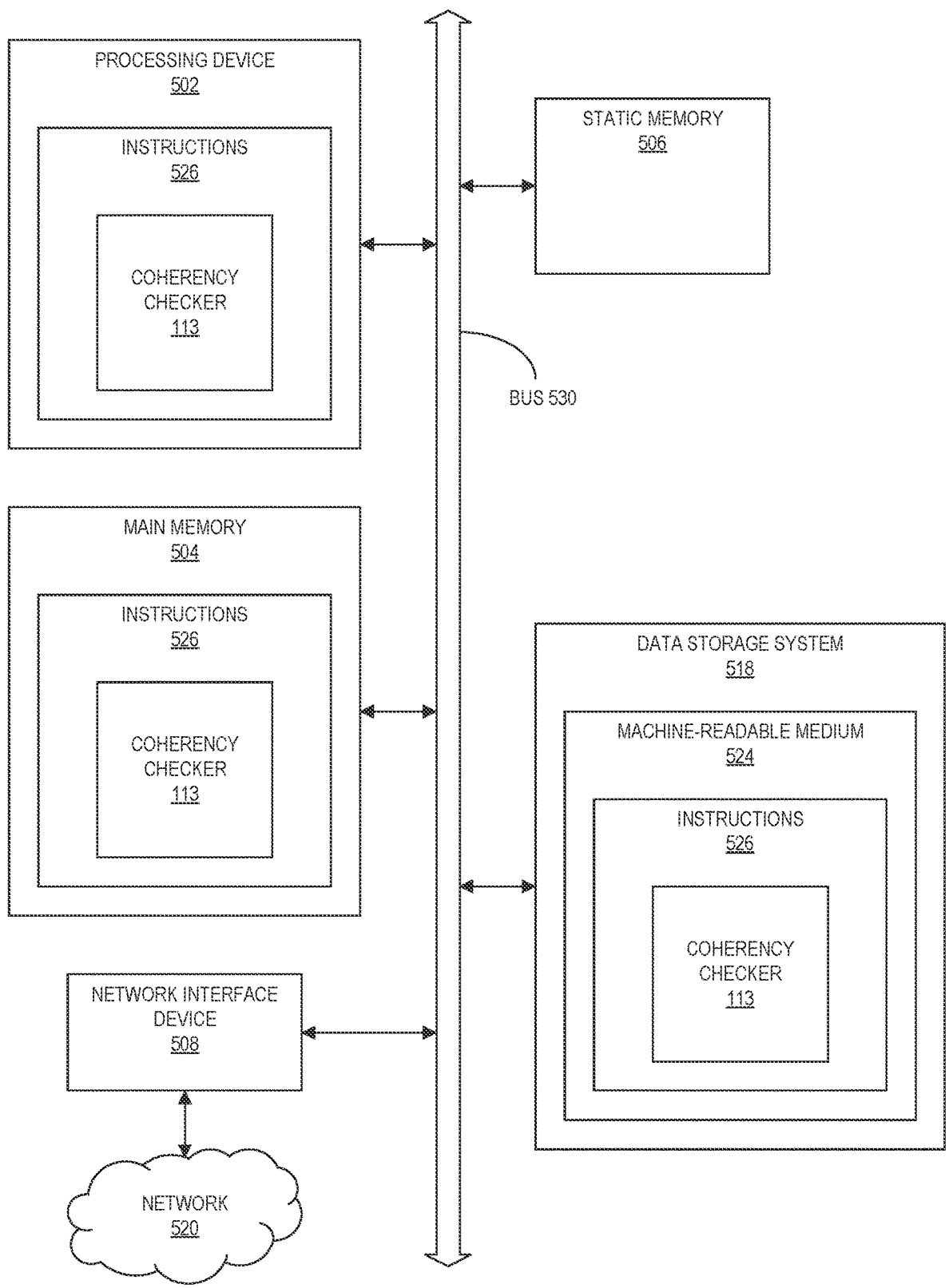
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 130 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the coherency checker 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to a coherency checker component (e.g., the coherency checker 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented method 300 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
assigning a first operation identifier to a current operation directed to a memory component, the first operation identifier having a first entry in a first data structure that associates the first operation identifier with a first buffer identifier;

determining whether the current operation collides with a prior operation assigned a second operation identifier, the second operation identifier having a second entry in the first data structure that associates the second operation identifier with a second buffer identifier; and updating, in response to determining that the current operation collides with the prior operation and that the current and prior operations are read operations, the entry in the first data structure associated with the second operation identifier to identify the first operation identifier.

2. The method of claim 1, wherein the determining whether the current operation collides with the prior operation comprises checking a second data structure for an entry that has an address value that matches the address to which the current operation is directed.

3. The method of claim 1, further comprising incrementing a counter associated with the first buffer identifier.

4. The method of claim 1, wherein the first data structure is stored in a memory outside of the memory component.

5. The method of claim 1, further comprising:
assigning a third operation identifier to a subsequent operation directed to a memory component, the third operation identifier having a third entry in the first data structure that associates the third operation identifier with a third buffer identifier; and updating, in response to determining that the subsequent operation collides with the current operation and that the subsequent operation is a read operation, the third buffer identifier to include the first buffer identifier associated with the current operation.

6. The method of claim 5, wherein the updating comprises replacing the third buffer identifier with the first buffer identifier.

7. The method of claim 1, further comprising:
updating a latest flag to indicate that the first entry is a latest operation directed to an address.

8. A non-transitory computer-readable storage medium comprising instructions that, when executed by a processing device, cause the processing device to:
assign a first operation identifier to a current operation directed to a memory component, the first operation identifier having a first entry in a first data structure that associates the first operation identifier with a first buffer identifier;

determine whether the current operation collides with a prior operation assigned a second operation identifier, the second operation identifier having a second entry in the first data structure that associates the second operation identifier with a second buffer identifier; and update, in response to determining that the current operation collides with the prior operation and that the current and prior operations are read operations, the entry in the first data structure associated with the second operation identifier to identify the first operation identifier.

9. The non-transitory computer-readable storage medium of claim 8, wherein the determining whether the current operation collides with the prior operation comprises checking a second data structure for an entry that has an address value that matches the address to which the current operation is directed.

10. The non-transitory computer-readable storage medium of claim 8, wherein the processing device is further to increment a counter associated with the first buffer identifier.

11. The non-transitory computer-readable storage medium of claim 8, wherein the first data structure is stored in a memory outside of the memory component.

12. The non-transitory computer-readable storage medium of claim 8, wherein the processing device is further to:
assign a third operation identifier to a subsequent operation directed to a memory component, the third operation identifier having a third entry in the first data structure that associates the third operation identifier with a third buffer identifier; and update, in response to determining that the subsequent operation collides with the current operation and that the subsequent operation is a read operation, the third buffer identifier to include the first buffer identifier associated with the current operation.

13. The non-transitory computer-readable storage medium of claim 12, wherein the updating comprises replacing the third buffer identifier with the first buffer identifier.

14. The non-transitory computer-readable storage medium of claim 8, wherein the processing device is further to:
update a latest flag to indicate that the first entry is a latest operation directed to an address.

15. A system comprising:
a memory component; and
a processing device, operatively coupled with the memory component, to:
assign a first operation identifier to a current operation directed to a memory component, the first operation identifier having a first entry in a first data structure that associates the first operation identifier with a first buffer identifier;

determine whether the current operation collides with a prior operation assigned a second operation identifier, the second operation identifier having a second entry in the first data structure that associates the second operation identifier with a second buffer identifier;

update, in response to determining that the current operation collides with the prior operation and that the current and prior operations are read operations, the entry in the first data structure associated with the second operation identifier to identify the first operation identifier; and increment a counter associated with the first buffer identifier.

16. The system of claim 15, wherein the determining whether the current operation collides with the prior operation comprises checking a second data structure for an entry that has an address value that matches the address to which the current operation is directed.

17. The system of claim 15, wherein the first data structure is stored in a memory outside of the memory component.

18. The system of claim 15, wherein the processing device is further to:
assign a third operation identifier to a subsequent operation directed to a memory component, the third operation identifier having a third entry in the first data structure that associates the third operation identifier with a third buffer identifier; and update, in response to determining that the subsequent operation collides with the current operation and that the subsequent operation is a read operation, the third buffer identifier to include the first buffer identifier associated with the current operation.

19. The system of claim 18, wherein the updating comprises replacing the third buffer identifier with the first buffer identifier.

20. The system of claim 15, wherein the processing device is further to:
   update a latest flag to indicate that the first entry is a latest operation directed to an address.

* * * * *